United States Patent
Cotterell

(10) Patent No.: US 11,213,130 B2
(45) Date of Patent: Jan. 4, 2022

(54) HEADREST COVER HOLDER SYSTEM

(71) Applicant: Lascelles Cotterell, Pickering (CA)

(72) Inventor: Lascelles Cotterell, Pickering (CA)

( * ) Notice: Subject to any disclaimer, the term of this patent is extended or adjusted under 35 U.S.C. 154(b) by 0 days.

(21) Appl. No.: 17/024,244

(22) Filed: Sep. 17, 2020

(65) Prior Publication Data
US 2021/0000260 A1 Jan. 7, 2021

Related U.S. Application Data

(63) Continuation-in-part of application No. 15/914,105, filed on Mar. 7, 2018, now abandoned.

(51) Int. Cl.
| | |
|---|---|
| *A47C 7/38* | (2006.01) |
| *A47C 7/62* | (2006.01) |
| *B60N 2/879* | (2018.01) |
| *B60N 2/60* | (2006.01) |
| *B60N 2/24* | (2006.01) |
| *B64D 11/06* | (2006.01) |
| *B60R 11/02* | (2006.01) |
| *B61D 33/00* | (2006.01) |
| *B60R 11/00* | (2006.01) |

(52) U.S. Cl.
CPC .............. *A47C 7/386* (2013.01); *B60N 2/242* (2013.01); *B60N 2/6063* (2013.01); *B60N 2/879* (2018.02); *B60R 11/02* (2013.01); *B64D 11/0636* (2014.12); *B64D 11/0647* (2014.12); *B60R 2011/0017* (2013.01); *B61D 33/005* (2013.01)

(58) Field of Classification Search
CPC . A47C 7/386; B60R 11/02; B60R 2011/0017; B64D 11/0636; B64D 11/0647; B60N 2/879; B60N 2/242; B60N 2/6063
USPC ........................................................ 297/163
See application file for complete search history.

(56) References Cited

U.S. PATENT DOCUMENTS

| | | | | |
|---|---|---|---|---|
| 6,786,547 | B1* | 9/2004 | Chu ..................... | B60N 2/5858 297/220 |
| 7,665,804 | B1* | 2/2010 | Jeffrey ................. | G09F 21/049 297/220 |
| 2003/0226148 | A1* | 12/2003 | Ferguson ............ | B60R 11/0235 725/75 |
| 2004/0144817 | A1* | 7/2004 | Albert .................... | B60R 11/02 224/275 |
| 2007/0090669 | A1* | 4/2007 | Aharoni ................ | B60N 2/882 297/61 |
| 2007/0257533 | A1* | 11/2007 | Resendez ............. | B60N 2/6063 297/228.11 |
| 2009/0278389 | A1* | 11/2009 | Pos ...................... | B60N 2/2863 297/217.3 |
| 2010/0007805 | A1* | 1/2010 | Vitito .................... | B60K 37/06 348/837 |
| 2011/0278885 | A1* | 11/2011 | Procter ............... | B60R 11/0252 297/135 |
| 2014/0028063 | A1* | 1/2014 | Firestone ............ | B60N 2/6081 297/188.01 |

(Continued)

*Primary Examiner* — Mark R Wendell
(74) *Attorney, Agent, or Firm* — Robert C. Corbett; Technology Law, PLLC

(57) ABSTRACT

A cover for a vehicle seat headrest includes one opening to accommodate a protuberance at the front of the headrest, such as a protuberant cushion or pillow, and another opening at the rear to permit access to a passenger behind the vehicle seat to access or view items attached to, or stored within, the rear of the headrest.

16 Claims, 11 Drawing Sheets

(56) References Cited

U.S. PATENT DOCUMENTS

| | | | |
|---|---|---|---|
| 2014/0284972 A1* | 9/2014 | Riedel | B64D 11/00152 297/188.04 |
| 2014/0284973 A1* | 9/2014 | Wolgast | B64D 11/00155 297/188.04 |
| 2015/0123433 A1* | 5/2015 | Lamb, Jr. | B60R 11/0229 297/188.05 |
| 2015/0329209 A1* | 11/2015 | Muirhead | B64D 11/0015 224/275 |

* cited by examiner

HEADREST COVER HOLDER SYSTEM

CROSS-REFERENCE TO RELATED APPLICATION

This application is a continuation in part of U.S. patent application Ser. No. 15/914,105, filed Mar. 7, 2018, and which is hereby incorporated by reference in its entirety.

TECHNICAL FIELD

This disclosure relates generally to the field of storage and mounting devices and more specifically relates to a storage device attachable to a headrest.

BACKGROUND

People often travel using bus, train and airplane. As a form of entertainment to help pass time, some buses, trains and airplanes have incorporated built-in video entertainment units. Many buses, trains and airplanes now incorporate individual entertainment units for each passenger, which are often located in the upper seatbacks of passenger seats. However, often only a limited number of programming options are available on such displays. Personal electronic devices, such as tablets, computers, smartphones and mobile gaming platforms, offer additional entertainment options in comparison to the individual entertainment units. Personal electronic devices usually allow a user to store and customize their own content, so that they are not limited to the content then-stored in an individual entertainment unit. Unfortunately, a user must hold a personal electronic device in one's hands or place it on a fold-down tray table. Holding a personal electronic device for extended periods can lead to fatigue and discomfort. The use of a tray table may not provide an optimum viewing angle, and in any event, the tray table is often occupied during in-transit meals or unable to use due the seatbelt indictor light is on during flight which passengers still desire the use of their personal electronic devices. A suitable solution is desired.

SUMMARY

According to one aspect of the disclosure, a seat assembly includes a seat with a headrest having a front surface defining a protuberance. A headrest cover includes a sleeve that defines a chamber having a first opening and a second opening. The seat extends through the first opening such that the headrest is at least partially contained within the chamber and the protuberance extends through the second opening.

Accordingly, the cover can accommodate headrests having bulges or protuberances. The headrest cover may include elastic portions that enable the cover to be elastically deformed to accommodate the bulge or protuberance during installation of the cover, and return to its unstressed size and shape for a snug fit after installation, which provides added stability of the cover and improved aesthetics.

A corresponding headrest cover and a method of use are also provided. The above features and advantages and other features and advantages of the present disclosure are readily apparent from the following detailed description of the best modes for carrying out the disclosure when taken in connection with the accompanying drawings.

DESCRIPTION OF THE PREFERRED EMBODIMENTS

As discussed above, embodiments of the present disclosure relate to a storage and mounting device and more particularly to a headrest cover holder system as used to improve the storage and mounting of a personal electronic device on a headrest.

Generally, the invention is a sleeve or headrest cover for a seat on a bus, train or airplane that holds a tablet or other electronic device. Passengers no longer have use a folding tray behind an aircraft seat to place their electronic device. The headrest cover holder system includes a leather/vinyl (or other suitable material for hygienic cleaning) sleeve that may be placed over the headrest. The device includes a padded cushion on a front side for additional comfort and relaxation for passengers. The headrest cover holder system provides hands free comfort for passengers and eliminated the need to share a folding tray with beverages/food. A user no longer needs to use one's lap/knees or hands as a placeholder for an electronic device. The device may be used with any type of BLUETOOTH® device on buses, trains and airplanes with the folding tray acting as a desk/placeholder. Adjustable angle settings may be provided for various viewing. The device maintains full access to a screen, and all universal ports, speakers, microphones, cameras on an electronic device.

Figure 1:
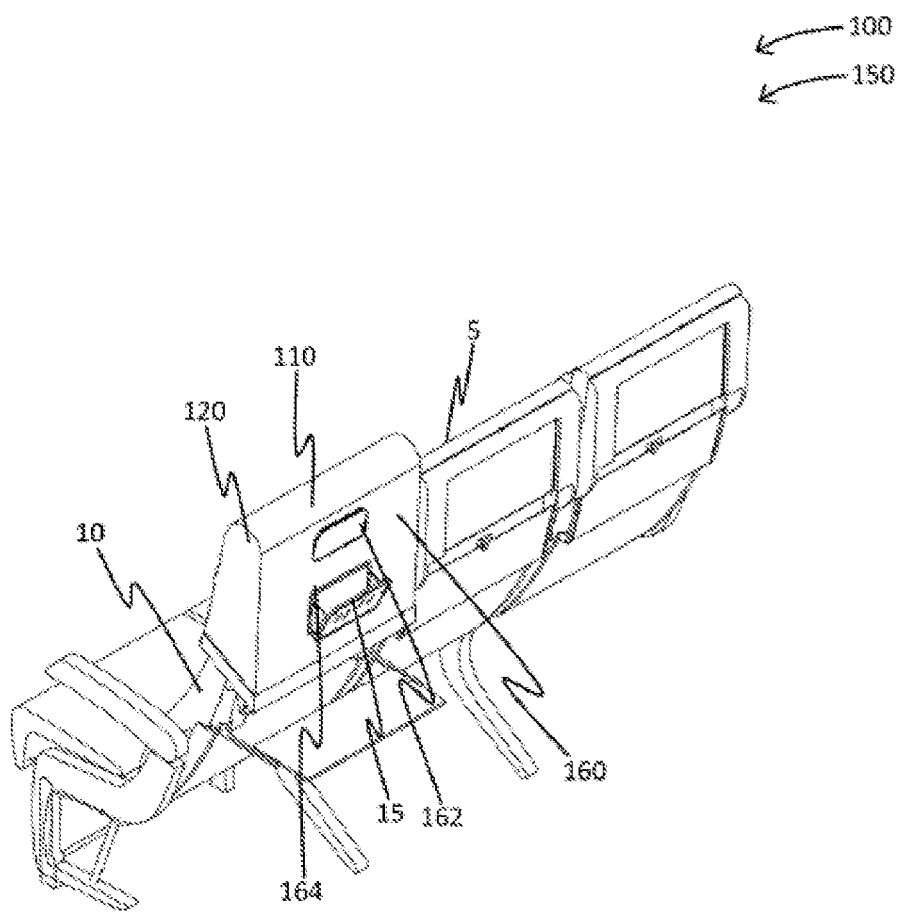
FIG. 1 is a perspective view of the headrest cover holder system during an "in-use" condition, according to an embodiment of the disclosure.
Figure 2:
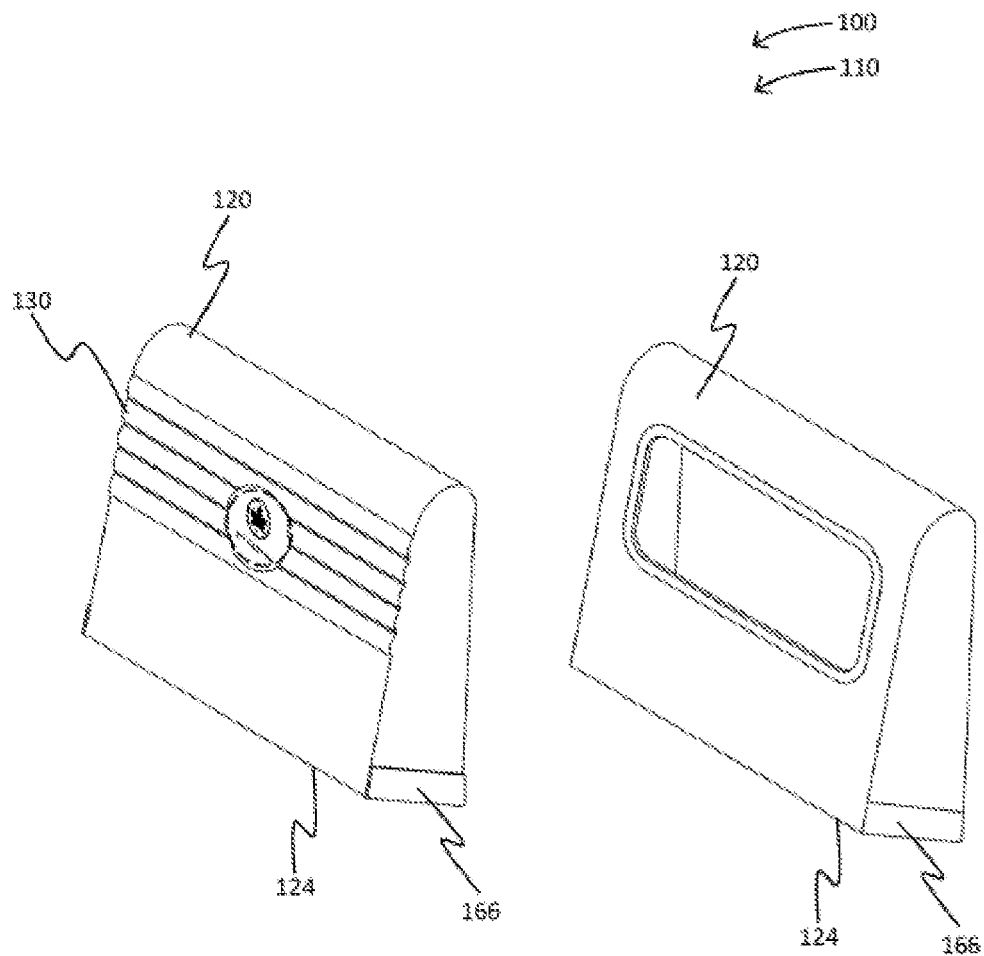
FIG. 2A is a perspective view of the headrest cover holder system of FIG. 1, according to an embodiment of the present disclosure.
FIG. 2B is a perspective view of the headrest cover holder system of FIG. 1, according to an embodiment of the present disclosure.

Referring now more specifically to the drawings by numerals of reference, there is shown in FIGS. 1-5, various views of a headrest cover holder system 100. FIG. 1 shows a headrest cover holder system 100 during an 'in-use' condition 150, according to an embodiment of the present disclosure. As illustrated, the headrest cover holder system 100 may include a sleeve 110 having a closed top-end 120, an open bottom-end 124, a front-surface 130, a rear-surface 160 including at least one cut-out 162, and an electronic device mount 164, and a fastener 166. The sleeve 110 comprises the closed top-end 120, the open bottom-end 124, the front-surface 130, the rear-surface 160, and the fastener 166 in functional combination. The sleeve 110 is configured to be removably installed on a headrest 5 of a seat 10 on a passenger-vehicle.

FIGS. 2A and 2B show a perspective views of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The front-surface 130 is positioned on a front-side of a headrest 5, the closed top-end 120 is positioned on a top of the headrest 5, and the rear-surface 160 is positioned adjacent a rear-side of the headrest 5 during an in-use condition. As shown in FIG. 2B, the sleeve 110 may include a stretchable and expandable material to allow the device to retro-fit a head rest wing of certain aircraft chairs that have a head rest wing. Therefore, passengers have access to the head rest wing for adjusting side flaps of the head rest wing.

Figure 3:
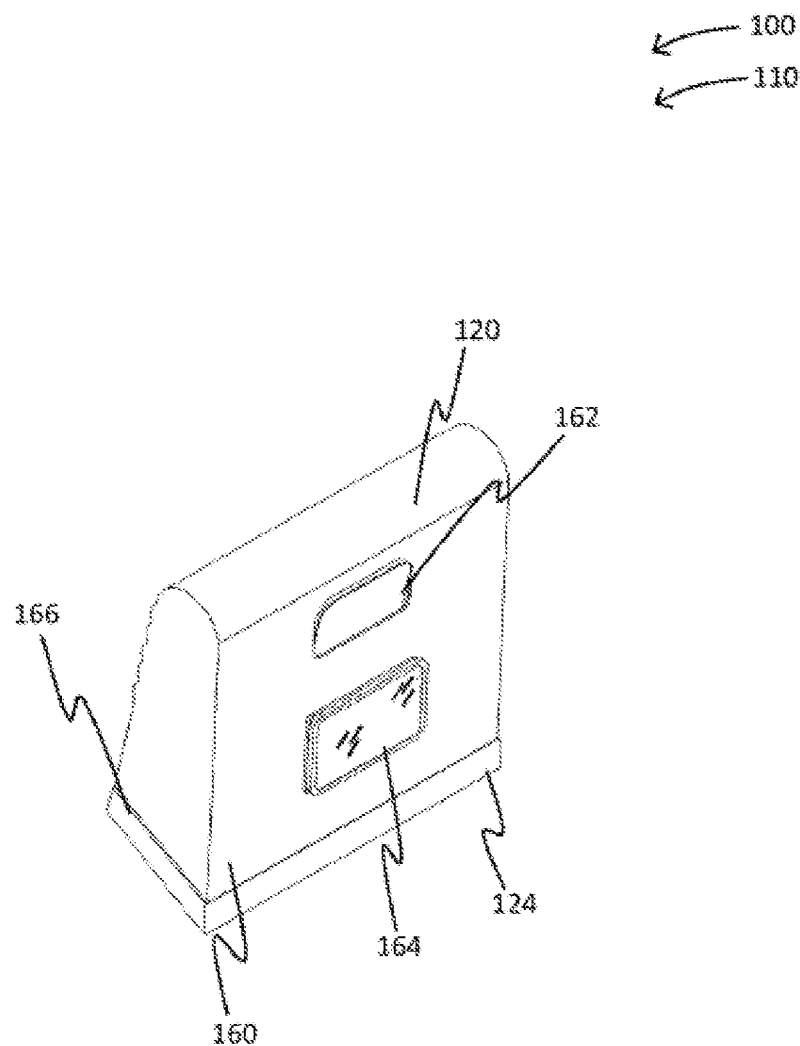
FIG. 3 is a perspective view of the headrest cover holder system of FIG. 1, according to an embodiment of the present disclosure.

Referring now to FIG. 3 showing a perspective view of the headrest cover holder system 100 of FIG. 1, according to an embodiment of the present disclosure. As above, the headrest cover holder system 100 may include the sleeve 110. The sleeve 110 is flexible and comprises washable material such as leather, vinyl, or other suitable material allowing the device to be cleaned and wiped down to maintain hygiene. The sleeve 110 includes a continuous piece of fabric encasing a right-side of the headrest, a left-side of the headrest, and the top of the headrest 5. The fastener 166 of the sleeve 110 comprises an elastic-fastener configured to secure the sleeve 110 to the seat 10 of the passenger-vehicle.

Figure 4:
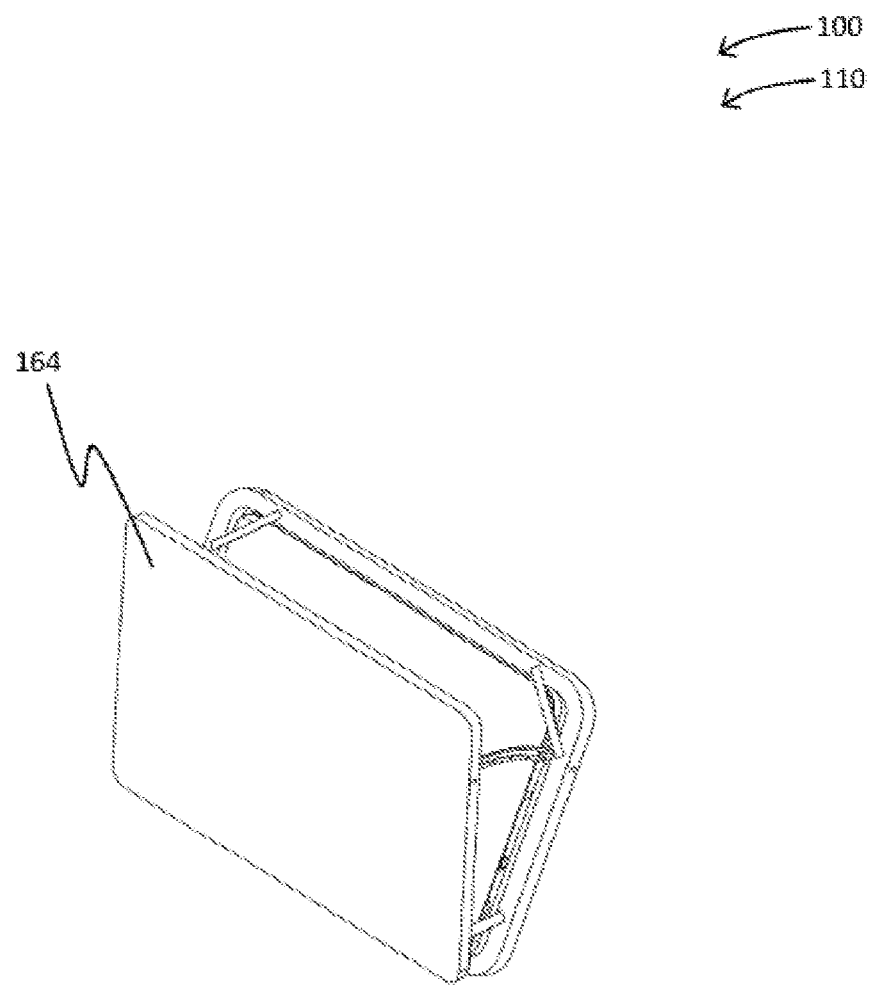
FIG. 4 is a perspective view of the headrest cover holder system of FIG. 1, according to an embodiment of the present disclosure.

FIG. 4 shows a perspective view of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The sleeve 110 configured to be removably installed on a headrest 5 of a seat 10 on a passenger-vehicle. The sleeve 110 is retrofittable to a variety of the passenger-vehicles. In a preferred embodiment, the passenger-vehicle comprises an airplane, bus, train or other passenger-vehicle. The open bottom-end 124 is configured to rest above a tray on the backside of the seat 10 of the passenger-vehicle and not extend past the tray. The at least one cut-out 162 is configured to provide access to items stored on a backside of the seat 10 on the passenger-vehicle such as an emergency card holder on an airplane. The at least one cut-out 162 is positioned above the electronic device mount 164. The at least one cut-out 162 comprises a substantially rectangular profile.

Figure 5:
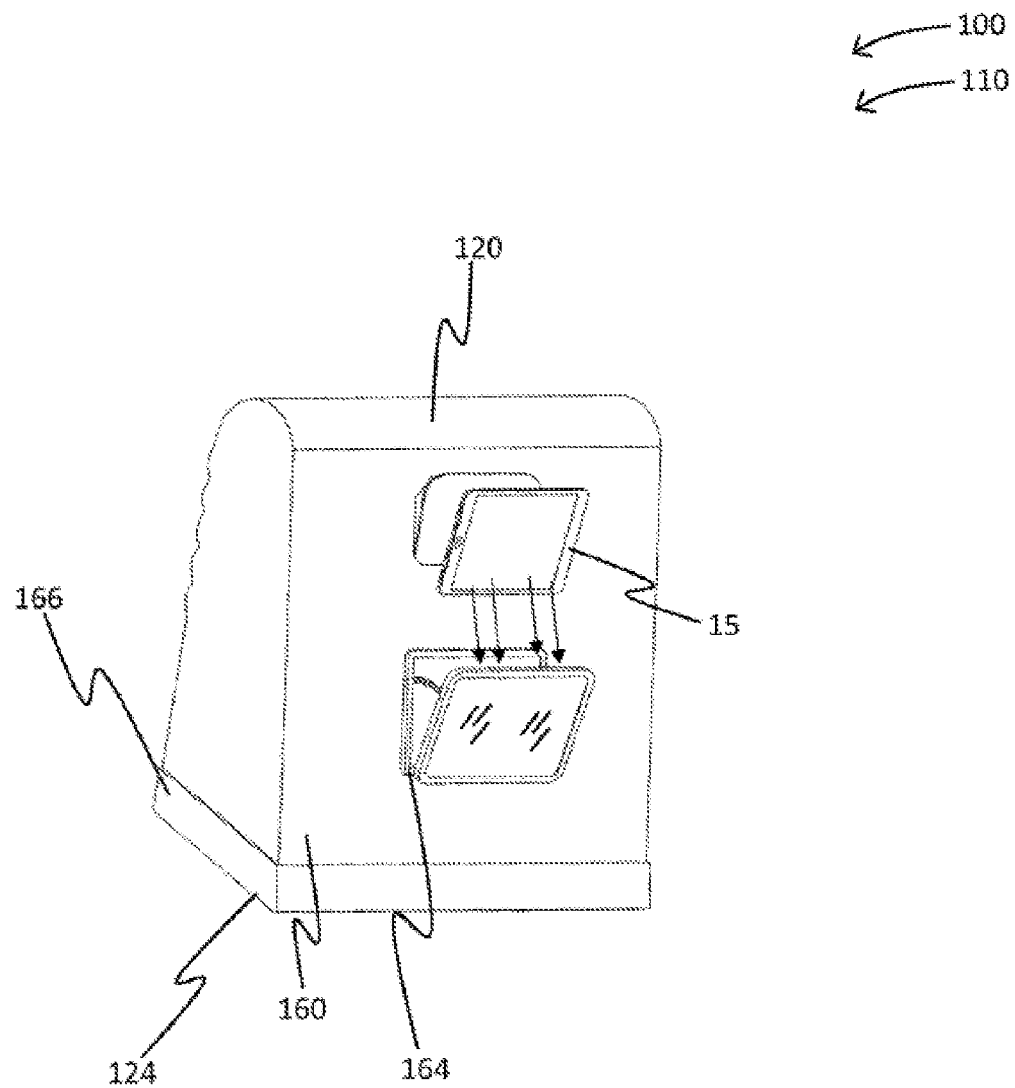
FIG. 5 is a perspective view of the headrest cover holder system of FIG. 1, according to an embodiment of the present disclosure.

Referring now to FIG. 5 showing a perspective view of the headrest cover holder system 100 of FIG. 1, according to an embodiment of the present disclosure. As above, the headrest cover holder system 100 may include the sleeve 110 having the closed top-end 120, the open bottom-end 124, the front-surface 130, the rear-surface 160 including at least one cut-out 162, and the electronic device mount 164, and the fastener 166. The front-surface 130 further comprises padding or a cushion to promote comfort of a passenger while seated with the device installed on the headrest 5 and a portion of a seat-back. The front-surface 130 may comprise functional indicia. The functional indicia may include advertising, company logos, or other desired indicia. The electronic device mount 164 is configured to receive an electronic-device 15 such as a tablet or mobile-phone for removable use. The electronic device mount 164 is adjustable and includes adjustable angle settings allowing a user to adjust an angle of the electronic-device 15 mounted within the electronic device mount 164.

FIGS. 6-11 schematically depict an alternative embodiment of a headrest cover holder system 200 in accordance with the claimed invention. Referring to FIGS. 6-11, wherein like reference numbers refer to like components throughout, the headrest cover holder system 200 includes a sleeve 204 that defines a cavity or chamber 208. More specifically, the sleeve 204 includes a front portion 212, a rear portion 216, a top portion 220, and lateral portions 224, 228 that cooperate to define the cavity or chamber 208 therebetween. The sleeve 204 includes a lower edge 232 that defines an opening 236 to the cavity or chamber 208. The front portion 212 also defines an opening 240 to the chamber 208. In the embodiment depicted, the rear portion 216 defines yet another opening 244 to the chamber 208. It should be noted that a sleeve may or may not include an opening 244 in the rear portion 216 within the scope of the claimed invention.

The sleeve 204 in the embodiment depicted is comprised of flexible fabric material. Those skilled in the art will recognize a variety of flexible fabric materials that may be employed within the scope of the invention, including, but not limited to, leather or vinyl. In the embodiment depicted, the lateral portions 224, 228 are comprised of an elastic fabric, such as but not limited to Spandex, while the rest of the sleeve 204 is a non-elastic fabric such as leather or vinyl. Accordingly, the elastic fabric enables the distance between the front portion 212 and the rear portion 216, and the size of the opening 236, to be selectively variable.

The head rest cover holder system 200 is configured for use with a vehicle seat 248. The vehicle seat 248 may be installed in any vehicle within the scope of the claimed invention, including, but not limited to, buses, airplanes, trains, etc. The vehicle seat 248 includes a seatback 252, which, as understood by those skilled in the art, extends generally vertically. The seatback 252 includes a front surface 256 against which an occupant of the seat 248 rests. The seat 248 includes a headrest portion 260, which may be an integral part of the seatback 252 as shown, or may be a separate unit attached to the seatback 252.

In the embodiment depicted, front surface 256 defines a protuberance 264 in the headrest portion 260. The protuberance 264 functions as a cushion or pillow to support the head of an occupant of the seat 248. When the sleeve 204 is unstressed, i.e., when the elastic fabric of lateral portions 224, 228 is not elastically strained, the width of the seatback 252, i.e., the distance from the rear surface 268 of the seatback 252 to the forwardmost point of the protuberance 264, is greater than the width of the opening 236 to the chamber 208. Accordingly, the protuberance 264 prevents the installation of the head rest cover holder system 200 to the headrest portion 260 when the sleeve 204 is in an unstressed state.

The elastic fabric material of lateral portions 224, 228 permits that installation of the head rest cover holder system 200 onto the headrest portion 260, while also facilitating a snug and reasonably tight secure fit of the system 200 on the headrest portion 260. More specifically, to install the head rest cover holder system 200, the sleeve 204 is moved such that the headrest portion 260 is inserted into the chamber 208 through the opening 236 defined by the lower edge 232. The elastic fabric of lateral portions 224, 228 is elastically strained by, for example, pulling the front portion 212 and the rear portion 216 away from each other, thereby to increase the width of the opening 236 and the chamber 208 to permit the passage of the protuberance 264 through the opening 236 and the chamber 208.

Figure 6:
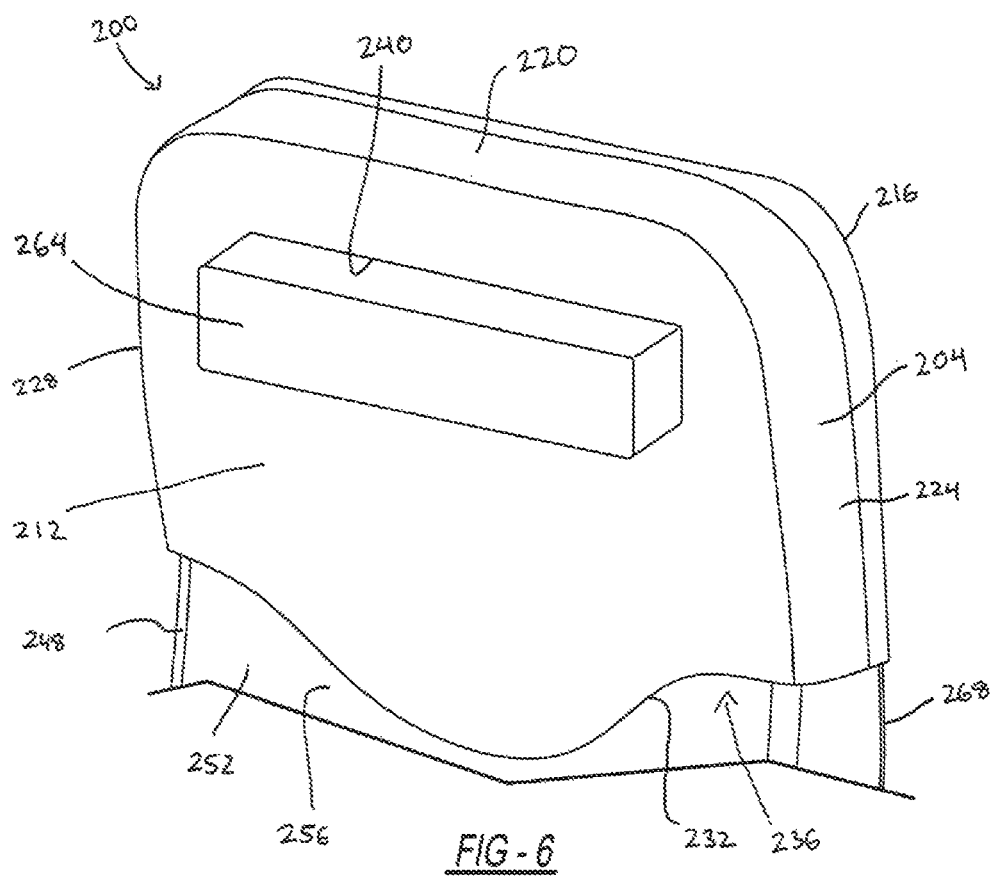
FIG. 6 is a front perspective view of another headrest cover holder system in accordance with the claimed invention installed on a headrest.
Figure 7:
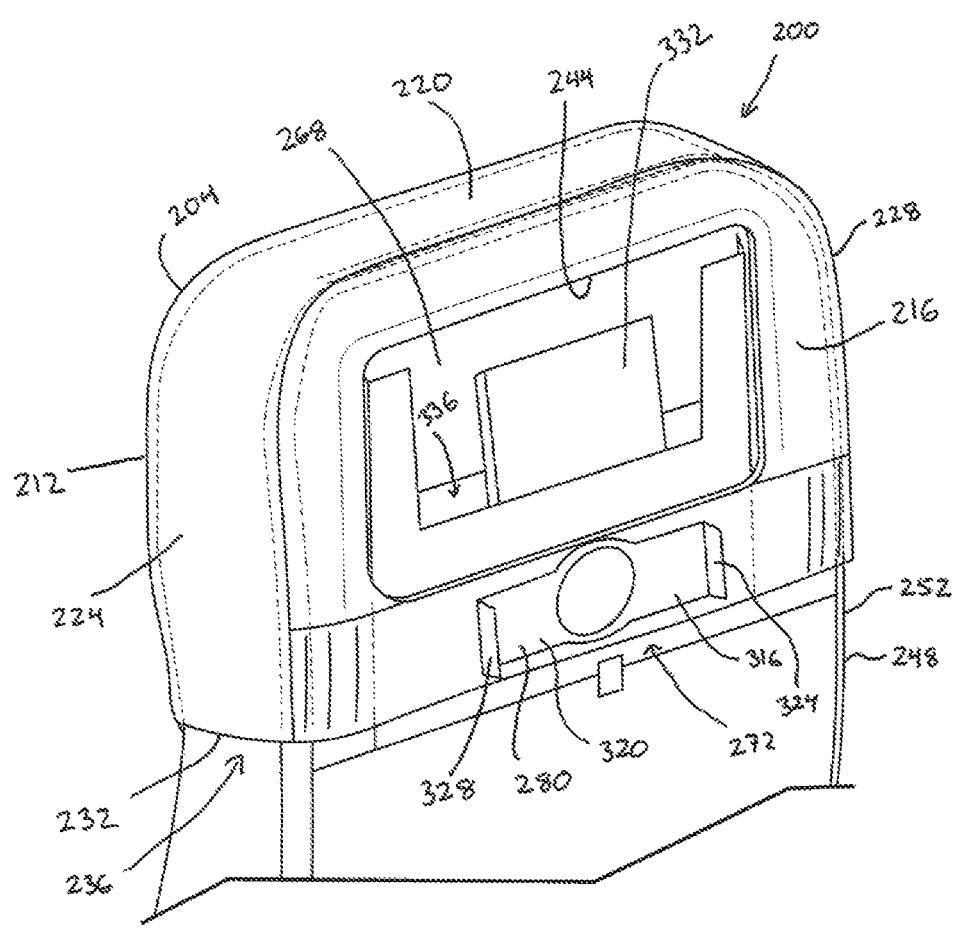
FIG. 7 is a rear perspective view of the headrest cover holder system of FIG. 6 installed on the headrest.
Figure 8:
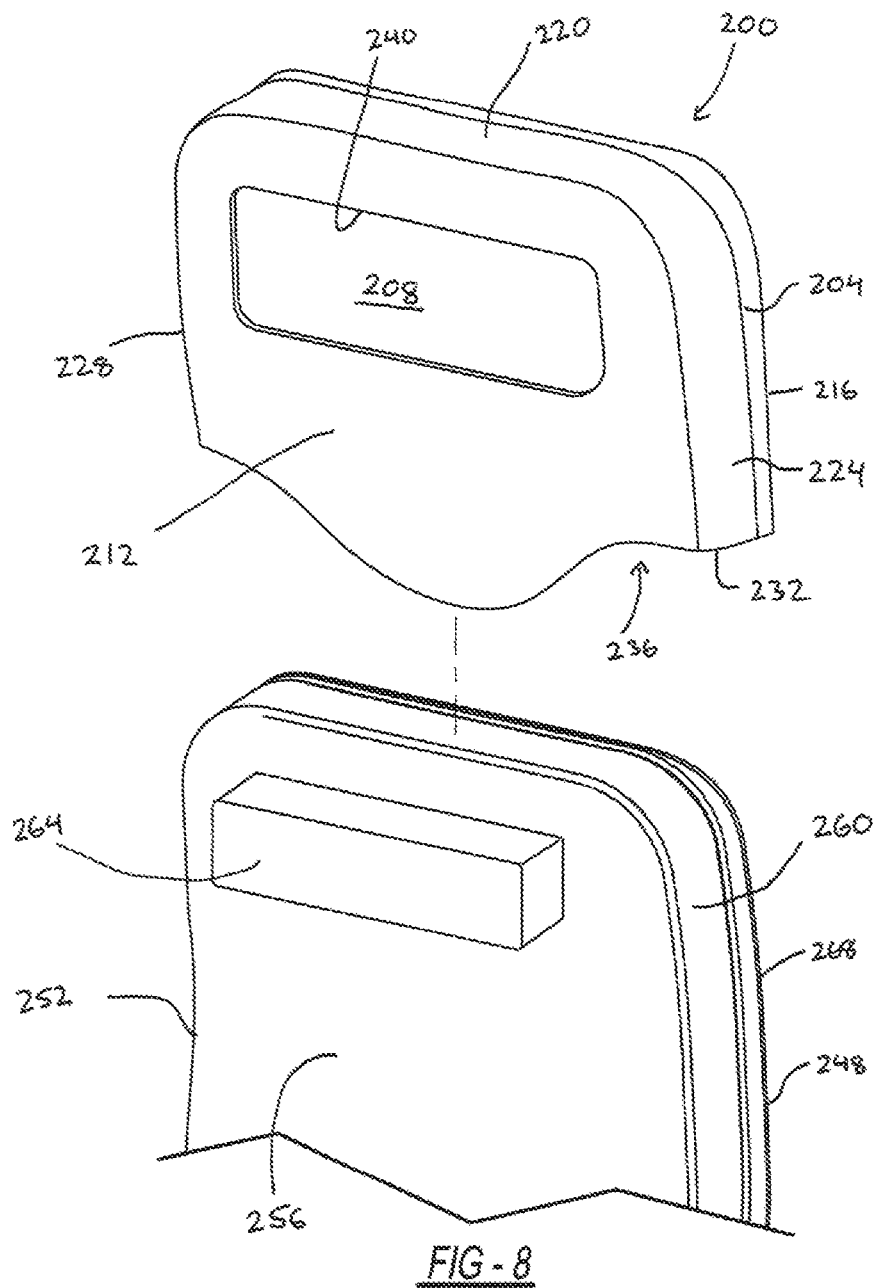
FIG. 8 is a front, perspective view of the headrest cover holder system of FIG. 6 in a position relative to the seat assembly prior to installation.
Figure 11:
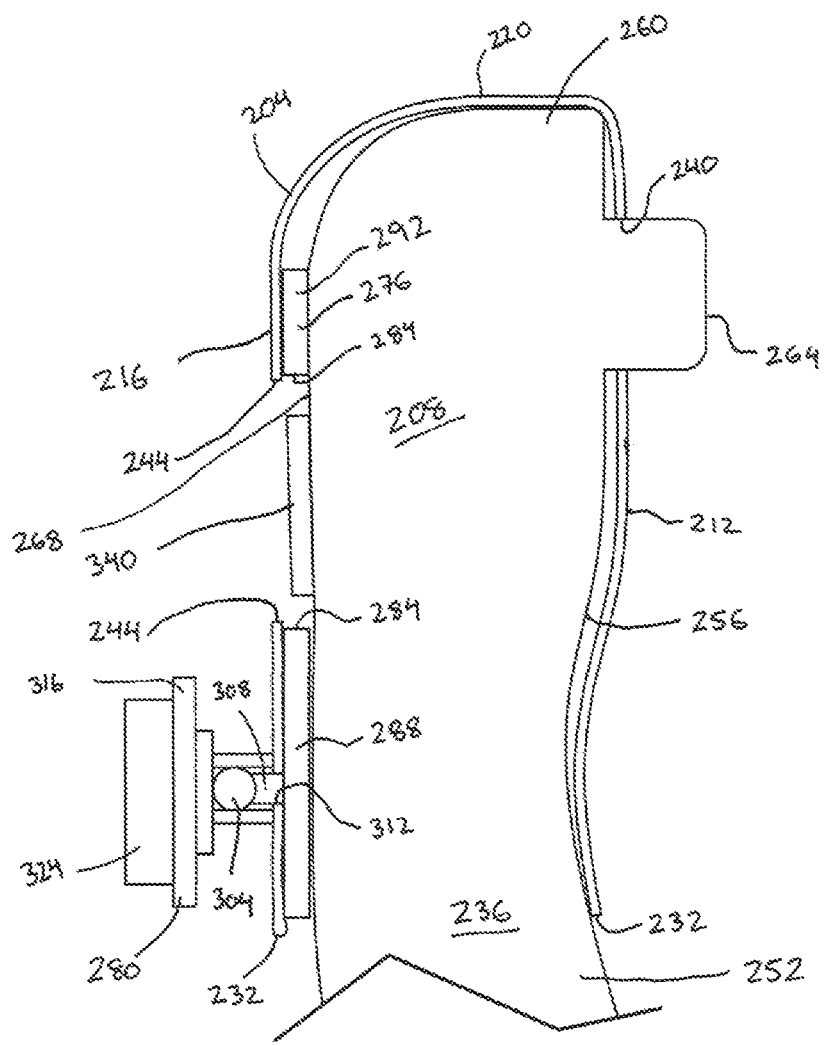
FIG. 11 is a schematic, cross-sectional, side view of the headrest cover holder system of FIG. 7 installed on a headrest with a screen.

In the embodiment depicted, insertion of the headrest portion 260 into the chamber 208 is complete when the top portion 220 of the sleeve contacts the top of the headrest portion 260 and the protuberance 264 extends out of the chamber 208 through the opening 240 in the front portion 212, as shown in FIGS. 6, 7, and 11. Permitting the sleeve 204 to return to its unstressed state will cause the opening 236 and the chamber 208 to narrow and provide a tight fit between the headrest portion 260 and the sleeve 204, which in turn improves aesthetics and stability of the system 200. It should be noted that, although the lateral portions 224, 228 comprise an elastic fabric in the embodiment depicted, lateral portions 224, 228 may also be comprised of non-elastic material within the scope of the claimed invention.

The head rest cover holder system 200 also includes a holder assembly 272 having a bracket member 276 and an electronic device holder 280. The bracket member 276 is comprised of a generally rigid material, such as a hard polymer. The bracket member 276 includes a stabilizing portion 282 that is attached to the rear portion 216 of the sleeve 204 such that portion 282 is parallel with the rear portion 216. In the embodiment depicted, portion 282 of the bracket member 276 defines an aperture 284. In the embodiment depicted, the aperture 284 is rectangular, and is formed by four linear segments 288, 292, 296, 300 of the stabilizing portion 282. Segments 288 and 292 extend parallel to one another and perpendicularly to segments 296 and 300. Segments 296 and 300 interconnect segments 288 and 292. The segments 288, 292, 296, 300 cooperate to define aperture 284 therebetween.

The bracket member 276 also includes an integrated fastener at which the electronic device holder 280 is connectable to the bracket member 276. In the embodiment depicted, the fastener is a ball 304 that cooperates with the electronic device holder 280 to form a ball and socket joint. Ball 304 is substantially spherical and is connected to segment 288 via a post 308 that extends perpendicularly from the segment 288. In the embodiment depicted, the ball 304, the post 308, and the segments 288, 292, 296, 300 are all formed by a single piece of material, such as by injection molding. This single-piece construction facilitates assembly of the head rest cover holder system 200.

More specifically, the segments 288, 292, 296, 300 defining the aperture 284 are attached to the rear portion 216 of the sleeve 204 such that the aperture 284 is aligned with the opening 244 in the sleeve 204. Segments 288, 292 are positioned on opposite sides of the opening 244 from one another, and segments 296, 300 are positioned on opposite sides of the opening 244 from one another. Those skilled in the art will recognize a variety of methods of attaching the segments 288, 292, 296, 300 to the rear portion 216 of the sleeve, including, but not limited to, sewing, adhesive bonding, etc.

The segments 288, 292, 296, 300 are positioned on the side of the rear portion 216 that faces the chamber 208, and are therefore not visible from the exterior of the chamber 208. Aperture 284 is larger than opening 244. Post 308 extends through a hole 312 in the rear portion 216 so that the ball 304 is positioned outside the chamber 208. The device holder 280 includes a socket that is matable with the ball 304 in a manner understood by those skilled in the art to form the ball and socket joint.

The device holder 280 in the embodiment depicted is a clamp mechanism having two clamp arms 316, 320, each having a respective flange 324, 328. An electronic device with a screen, such as a mobile phone or a tablet computer as shown at 15 in FIG. 5, is fittable between the flanges 324, 328 such that the flanges 324, 328 exert a force on opposite edges of the electronic device to releasably retain the device. The device holder 280 may be configured such that the distance between the flanges 324, 328 is selectively variable to accommodate electronic devices of different sizes. It should be noted that other electronic device holder configurations may be employed within the scope of the claimed invention.

When the head rest cover holder system 200 is installed on the headrest portion 260, a portion of the rear surface 268 of the seatback 252 and/or headrest portion 260 is visible and accessible from outside the chamber 208, as shown in FIGS. 7 and 11. More specifically, the portion of the rear surface 268 of the seatback 252 and/or headrest portion 260 is visible and accessible through the opening 244 in the rear portion 216 of the sleeve 204 and the aperture 284 formed by the bracket member 276. That is, a line of sight extends through the aperture 284 and opening 244 from rearward of the sleeve 204 to the chamber 208 or its contents.

Figure 9:
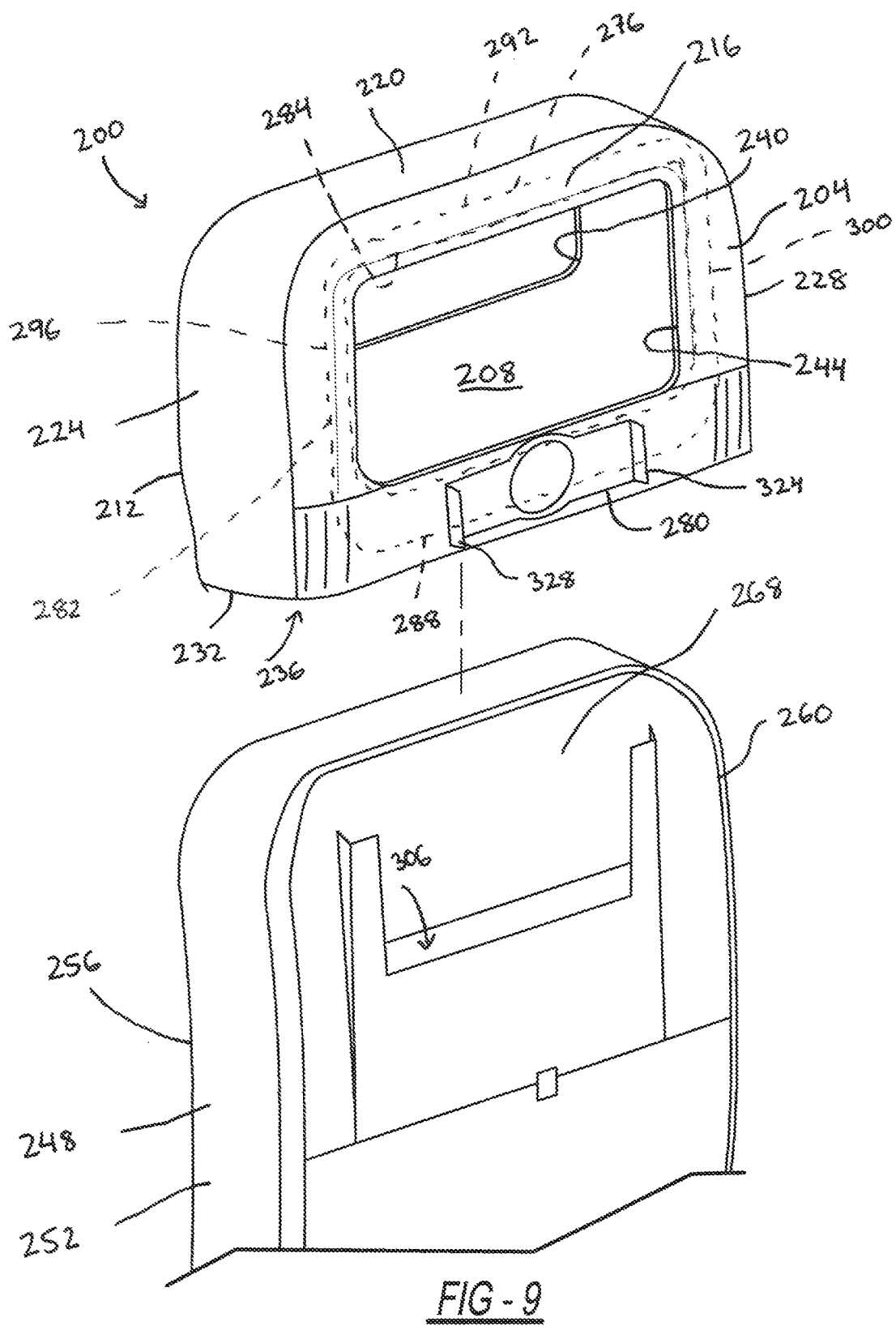
FIG. 9 is a rear, perspective view of the headrest cover holder system of FIG. 6 in a position relative to the seat assembly prior to installation
Figure 10:
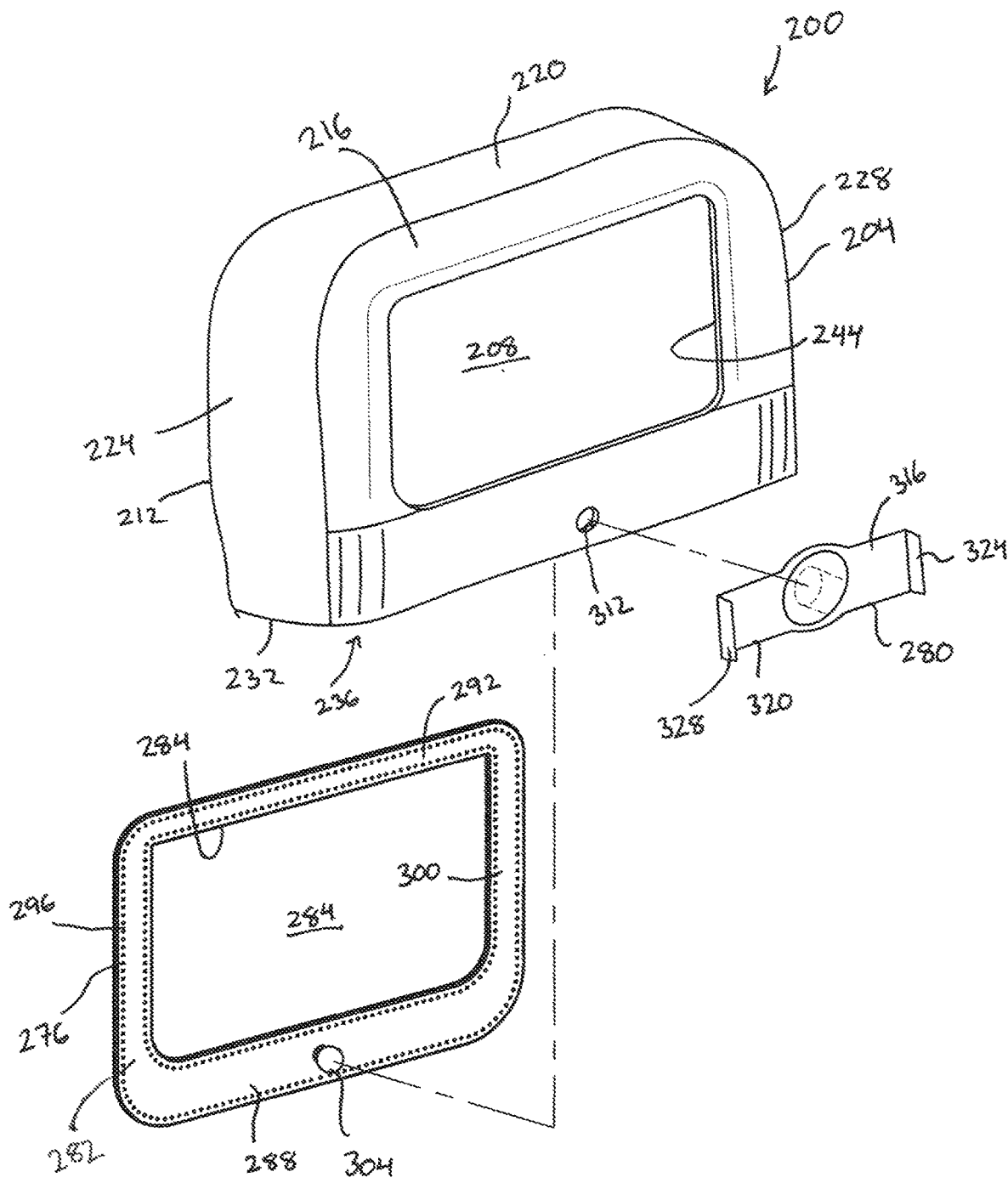
FIG. 10 is a rear, perspective, exploded view of the headrest cover holder system of FIG. 6.

Accordingly, the occupant of a seat located behind the seatback 252 has access to the contents of the chamber 208 via the aperture 284 and the opening 244. Contents of the chamber 208 visible and accessible via the opening 244 and the aperture 284 may include printed material 332, such as a magazine or a card with flight safety information, that is stored in a slot 336 formed in the rear surface 268 of the headrest portion 260, as shown in FIGS. 7 and 9. Contents of the chamber 208 visible through the opening 244 and the aperture 284 may also include a screen 340 mounted to the rear of the headrest portion 260, as shown in FIG. 11. The screen 340 is part of what is referred to as an in-flight entertainment system (IFE) and is pre-installed to the seat 248 prior to the installation of the headrest cover holder system 200 to the seat 248.

The bracket member 276 provides enhanced stability for the electronic device holder 280, and any electronic device attached thereto, because segments 288, 292, 296, 300 provide a large amount of surface area that interacts with both the sleeve 204 and the headrest portion 260 to prevent rotation of the bracket member 276, and, correspondingly, the device holder 280. The bracket member 276 achieves this enhanced stability while maintaining access to the rear of the headrest and anything attached or retained thereto by defining an aperture 284 that aligns with the opening 244, thereby ensuring that the opening 244 is not obstructed by the bracket member 276.

In one alternative embodiment (not shown), and within the scope of the claimed invention, portion 282 does not define an aperture. This alternative embodiment could be used with a sleeve 204 that does not have a rear opening 244 to the chamber 208.

While the best modes for carrying out the invention have been described in detail, those familiar with the art to which this invention relates will recognize various alternative designs and embodiments for practicing the invention within the scope of the appended claims.

The invention claimed is:

1. A seat assembly comprising:
a seat including a headrest having a front surface defining a protuberance;
a headrest cover including a sleeve that defines a chamber having a first opening and a second opening;
wherein the seat extends through the first opening such that the headrest is at least partially contained within the chamber and the protuberance extends through the second opening; and
wherein the protuberance includes a cushion or pillow.

2. The seat assembly of claim 1, wherein the sleeve defines a third opening to the chamber;
wherein the sleeve is positioned such that the third opening is to the rear of the headrest.

3. The seat assembly of claim 2, wherein at least a portion of the sleeve is comprised of elastic fabric.

4. The seat assembly of claim 3, wherein the sleeve includes a front portion that defines the second opening, a rear portion defining the third opening, and first and second lateral portions interconnecting the front and rear portions; and
wherein the first and second lateral portions are comprised of elastic fabric.

5. The seat assembly of claim 4, wherein the front portion and the rear portion are comprised of non-elastic fabric.

6. The seat assembly of claim 5, wherein the non-elastic fabric is selected from the group consisting of leather and vinyl.

7. The seat assembly of claim 1, further comprising an electronic device holder connected to the sleeve.

8. The seat assembly of claim 1, further comprising a bracket member being attached to the sleeve, said bracket member having a fastening element at which an electronic device holder is connectable to the bracket member.

9. The seat assembly of claim 8, wherein the sleeve defines a rear portion, and wherein the bracket member includes a stabilizing portion that is substantially parallel to the rear portion.

10. A headrest cover for a seat including a headrest having a front surface that defines a protuberance, the headrest cover comprising:
a sleeve having a front portion, a rear portion, a top portion, and first and second lateral portions that cooperate to define a chamber;
wherein the sleeve has a lower edge that defines a first opening to the chamber;
wherein the front portion defines a second opening to the chamber; and
wherein the second opening is sufficiently sized and shaped such that the protuberance is extendable through the second opening when the headrest is within the chamber;
a bracket member being attached to the rear portion, said bracket member having a fastening element at which an electronic device holder is connectable to the bracket member;
wherein the bracket member includes a stabilizing portion that is substantially parallel to the rear portion;
wherein the rear portion defines a third opening to the chamber;
wherein the stabilizing portion defines an aperture; and
wherein the aperture is aligned with the third opening such that a line of sight extends through both the aperture and the third opening.

11. The headrest cover of claim 10, wherein the front portion and the rear portion are comprised of a non-elastic fabric.

12. The headrest cover of claim 11, wherein the first and second lateral portions are comprised of an elastic fabric.

13. A method for use with a seat having a headrest with a front surface that defines a protuberance, the method comprising:
obtaining a headrest cover having a sleeve that defines a chamber having a first opening and a second opening; and
moving the headrest cover relative to the seat such that the headrest, including the protuberance, is inserted into the chamber through the first opening; and
extending at least a portion of the protuberance through the second opening;
wherein the protuberance includes a cushion or a pillow.

14. The method of claim 13, further comprising elastically deforming at least a portion of the sleeve to enlarge the first opening and the chamber when the protuberance is inserted into the chamber through the first opening.

15. The method of claim 13, wherein the headrest cover includes a bracket member attached to the sleeve, and a fastening element at which an electronic device holder is connectable.

16. The method of claim 13, wherein the sleeve has a front portion, a rear portion, a top portion, and first and second lateral portions that cooperate to define the chamber;
wherein the front portion defines the second opening;
wherein the rear portion defines a third opening to the chamber;
and wherein the headrest cover further includes an electronic device holder connected to the rear portion.

* * * * *